United States Patent
Johnson et al.

(10) Patent No.: US 10,553,060 B2
(45) Date of Patent: *Feb. 4, 2020

(54) METHOD AND APPARATUS FOR IMPLEMENTING MULTI-VENDOR ROLLING CODE KEYLESS ENTRY SYSTEMS

(71) Applicant: iKeyless, LLC, Louisville, KY (US)

(72) Inventors: Daniel Charles Johnson, Crestwood, KY (US); Daniel Patrick Bowen, Mountain View, CA (US); Michael Calvin McCoy, Palo Alto, CA (US)

(73) Assignee: IKEYLESS, LLC, Louisville, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/153,573

(22) Filed: Oct. 5, 2018

(65) Prior Publication Data

US 2019/0122472 A1 Apr. 25, 2019

Related U.S. Application Data

(63) Continuation of application No. 14/165,922, filed on Jan. 28, 2014, now Pat. No. 10,115,255.

(60) Provisional application No. 61/850,014, filed on Feb. 7, 2013.

(51) Int. Cl.
*G05B 19/00* (2006.01)
*G07C 9/00* (2020.01)
*B60R 25/24* (2013.01)

(52) U.S. Cl.
CPC .......... *G07C 9/00857* (2013.01); *B60R 25/24* (2013.01); *G07C 2009/00492* (2013.01)

(58) Field of Classification Search
CPC ...... G07C 9/00857; G07C 2009/00492; B60R 25/24
USPC .................................................. 340/5.25
See application file for complete search history.

(56) References Cited

U.S. PATENT DOCUMENTS

| | | | |
|---|---|---|---|
| 6,650,248 B1* | 11/2003 | O'Donnell | H04B 1/202 340/12.28 |
| 2001/0035811 A1* | 11/2001 | Dewan | B60R 25/24 340/5.25 |
| 2003/0117261 A1* | 6/2003 | Gunsch | G07C 9/00182 340/5.25 |
| 2005/0038718 A1* | 2/2005 | Barnes | G06Q 10/087 705/28 |
| 2005/0164728 A1* | 7/2005 | Matsubara | B60R 25/2009 455/521 |
| 2005/0248436 A1* | 11/2005 | Hohmann | B60R 25/24 340/5.72 |
| 2007/0001805 A1* | 1/2007 | Utter | B60R 25/24 340/5.72 |
| 2007/0255580 A1* | 11/2007 | Cole | G06F 21/10 705/1.1 |

(Continued)

*Primary Examiner* — Zhen Y Wu
(74) *Attorney, Agent, or Firm* — Duncan Galloway Egan Greenwald, PLLC; Kevin T. Duncan

(57) ABSTRACT

The present invention relates generally a system and method for providing rolling code remote device functions to provide keyless entry to multiple makes and models of cars. The present invention is adapted to produce the radio signal type and transmitted data of an original manufacturer's keyless entry remote device system by implementing multiple modulation schema and data encoding techniques.

19 Claims, 12 Drawing Sheets

(56) References Cited

U.S. PATENT DOCUMENTS

| | | | |
|---|---|---|---|
| 2008/0079602 A1* | 4/2008 | King | B60R 25/24 340/12.22 |
| 2008/0122594 A1* | 5/2008 | Brecht | B60R 25/24 340/426.11 |
| 2008/0174446 A1* | 7/2008 | Ghabra | B60R 25/2072 340/13.2 |
| 2009/0220243 A1* | 9/2009 | Petricoin, Jr. | G08C 17/00 398/106 |
| 2009/0231094 A1* | 9/2009 | Higgins | G07C 9/00309 340/5.64 |
| 2009/0264082 A1* | 10/2009 | Tieman | G01S 1/66 455/73 |
| 2009/0278656 A1* | 11/2009 | Lopez | B60R 25/24 340/5.72 |
| 2010/0051483 A1* | 3/2010 | Mastrodonato | A45C 11/182 206/37.2 |
| 2010/0207572 A1* | 8/2010 | Kirby | H02J 7/355 320/101 |
| 2011/0264304 A1* | 10/2011 | Burzio | B60R 25/04 701/2 |
| 2012/0124245 A1* | 5/2012 | Reeves | G05B 19/0426 710/8 |
| 2013/0009722 A1* | 1/2013 | White | H03H 7/40 333/17.3 |
| 2013/0211623 A1* | 8/2013 | Thompson | G07C 5/008 701/2 |

* cited by examiner

METHOD AND APPARATUS FOR IMPLEMENTING MULTI-VENDOR ROLLING CODE KEYLESS ENTRY SYSTEMS

CROSS REFERENCE TO RELATED APPLICATION

The present application claims benefit of priority to and is a continuation of U.S. patent application Ser. No. 14/165,922, filed Jan. 28, 2014, and entitled METHOD AND APPARATUS FOR IMPLEMENTING MULTI-VENDOR ROLLING CODE KEYLESS ENTRY SYSTEMS (Johnson et al.), which claims benefit of priority to U.S. Provisional Pat. Application Ser. No. 61/850,014, filed Feb. 2, 2013, and entitled METHOD AND APPARATUS FOR IMPLEMENTING MULTI-VENDOR ROLLING CODE KEYLESS ENTRY SYSTEMS (Bowen et al.), both of which are hereby incorporated by reference herein in their entirety.

FIELD OF INVENTION

The present invention generally relates to an radio frequency ("RF") device adapted to provide keyless entry capability to multiple makes and models of vehicles by replicating both the RF frequency and data transmitted by a manufacturer's original equipment ("OEM") keyless entry remote device. The present invention uses multiple modulation schemes and data encoding techniques to enable the full functionality available with an OEM keyless entry remote device. The present invention may be loaded with data stored in vendor specific profiles to implement specific transmit frequencies, modulation schemes, binary encoding algorithms, packet payload templates, and algorithms that are used to generate the rolling codes needed to replicate the function of an OEM keyless entry remote device.

BACKGROUND OF THE INVENTION

Remote Access systems for consumer vehicles have become a popular, if not essential, feature of most vehicles sold today. Nearly every vehicle on the market for the past several years has included some form of keyless entry as either a standard feature or add-on option. Consumers with older vehicles without remote access systems have been able to retrofit their vehicles with aftermarket systems.

The technologies behind these systems have evolved rapidly with remote systems moving from low security fixed codes with simple transmission schemes to high security encrypted rolling codes with advanced transmission protocols. Developers of these systems, both OEM and aftermarket, have been constantly refining and improving their offerings to take advantage of improvements in technology. Over time, the numerous designs and platforms, coupled with rapidly changing security technologies, have resulted in a great variety of remote devices and systems that are almost universally incompatible across vehicle brands or makes and even between different year and models of vehicles. Several problems exist with currently available OEM keyless entry remote devices.

First, retailers and resellers of vehicle remote devices must stock a large number of remote device stock keeping units ("SKU") to cover the breadth of vehicle makes, models, and years. Vehicle manufacturers may have a diverse range of remote devices among their models or they may be homogeneous in general but vary in small cosmetic changes like buttons or model labeling. This problem is compounded by the fact that many remote devices have very similar appearance but are not functionally interchangeable for a given car model or year. Resellers must maintain detailed compatibility databases and cope with end user confusion about which remote device can be paired with their car.

Second, replacement remote devices for those lost or damaged are typically proprietary and very expensive and available from the original manufacturer only for a limited number of years after the manufacturer stops production of the particular vehicle model. Once this window closes it may become increasingly difficult for consumers to buy a new OEM remote device.

Third, many consumers own more than one vehicle and each vehicle may be a different make or model and may have its own keyless entry remote device that is not compatible with the other vehicles owned by the consumer. Managing two or more remote devices can be a nuisance and confusing if the remote devices feel or look similar but are incompatible.

Finally, the features and capabilities of a given OEM or aftermarket remote device are limited by the technologies of period it was produced. Many remote devices were designed with poor analog transmitters that lacked range or battery life. These remote devices may have used fixed or simple rolling codes in their protocol that limit their security margin.

Another challenge with OEM remote devices is that there are no enforced standards for implementing rolling code locking systems and remote devices. Remote keyless entry systems known in the art employ a wide range of schemes for generating the key sequences used by remote devices. There are several common data formats used in remote device RF radio transmissions and each type is typically referred to as a code. These code types include fixed codes, rolling codes, and encrypted rolling codes.

The first generation of keyless entry remote devices transmitted the same data pattern every time a key was pressed. This is referred to as a "fixed code." The data is simple, and usually consists of an ID code and function code. For example, a fixed code remote device would generate a signal by combining an ID code of 01010 and a function code of 111, which when put together is sent or transmitted as 01010111. Other keys on the remote device might have function codes of 000, 001, 011, etc., but the ID code would be the same for each key, ex: 01010000. Most fixed code remote devices have a different ID code, but all units of a particular remote device model shared the same function codes. Increasingly, over time this type of code could easily be intercepted by an unauthorized person and replayed through a transmitter to gain unauthorized access to the vehicle.

To eliminate the replay vulnerability of fixed codes, the ID code was made longer, and made to change in a pre-defined number sequence every time a button was pressed, this is known as a "rolling code". The ID number sequence was known to the remote device, and the car receiver. They merely had to be synchronized to the same point in the sequence, and the car would always know what code should come next in sequence from the remote device. However, this sequence is not a pre-stored list of numbers. The next number is generated by a mathematical formula that produces a known sequence of what appears to be random numbers. This approach provides a much greater level of security, as an attacker must exactly replicate the mathematical algorithm used to generate the numbers. The difficulty in recreating the original algorithm is easily increased by making the ID code longer, but this too can be subject to a replay attack.

An encrypted rolling code remote device encrypts the signal generated by the rolling code system before radio transmission, making it more difficult for an unauthorized person to analyze the rolling code content. Encryption schemes vary from vendor to vendor and usually include longer key sequences and specialized hardware to generate the encrypted key sequences. Keeping in mind that rolling code remote devices also increment their key sequences, many vendors also use elaborate algorithms to determine the amount by which the key sequence number will be incremented. Additionally, complex authentication schemes can be used between the remote device, the user's physical transponder key, and the RF base station in the vehicle to validate the key that was provided by remote device.

The use of multiple code schemes in the art makes it very challenging to create a device that is compatible with multiple makes and models of vehicle or with multiple remote devices. Furthermore, remote devices known in the art are typically frequency fixed. Frequency fixed remote devices cannot be reprogrammed to work optimally or at all at different transmission frequencies.

What is needed is a programmable and reconfigurable keyless entry remote device that solves the availability, security, and technical problems of existing OEM keyless entry remote devices.

SUMMARY OF THE INVENTION

The present invention provides in one embodiment, a device that is capable of providing rolling code remote device functions to provide keyless entry to multiple makes and models of cars. This type of device may also be used in other RF locking applications such as garage door openers, industrial controls, sensor systems, and other remote control applications. For the purpose of simplifying the discussion the present invention principally describes an embodiment of the invention as a device used in automobile remote device keyless entry systems. However, the present invention may also be used in a broad range of rolling code lock related applications.

The present invention recreates, with exact precision, the radio signal type and transmitted data of the OEM remote device that was originally provided with a vehicle. To do so, the present invention implements multiple modulation schemes and data encoding techniques. The binary information (data) that is transmitted through the radio signal is the primary concern in replicating the radio signal type and transmitted data of an OEM remote device. The binary data forms a data packet that contains headers, button IDs, checksums, and other device information which includes a key sequence. The key sequence is typically generated using various encryption algorithms. In a rolling code remote device, this key sequence is numerically incremented based on a vendor specific algorithm each time a button on the remote device is activated. This data is verified, synchronized, and authenticated by a base station unit in the vehicle when the remote device is used to lock or unlock the vehicle.

The present invention is unique in that it can provide interoperability with rolling code remote devices from multiple manufacturers. To provide this functionality the present invention stores vendor-specific profiles that allow the present invention to implement specific transmit frequencies, modulation schemes, binary encoding algorithms, packet payload templates, and the algorithm that is used to generate the necessary rolling code. Procedures used to program remote devices also vary widely from vendor to vendor. In order to address the required programming modes, the present invention may include hardware interfaces for infrared ("IR") sensors/receivers, high frequency RF transmitters/receivers (300 MHz-900 MHz), and low frequency RF receivers. The programming sequence required to program the device will also be stored in memory using the previously mentioned vendor profiles. The present invention also includes a discussion of various systems that could be used to program these devices for the end user.

The present invention creates a single remote device that can be configured to emulate a large portion of the available remote devices and be as broadly compatible as possible. One embodiment of the present invention provides a method and apparatus for implementing multi-vendor rolling code lock systems that make use of vendor profiles to ensure that the resulting products are compatible and interoperable with the original OEM product. This embodiment may be used for automobile remote device keyless entry systems but the principles and techniques described herein may be applied to many other products where a secure locking system is required.

The present invention makes use of a novel collection of circuit functions to allow for a wide range of programmability and customization. In one embodiment, a unique transceiver architecture allows the device to simultaneously transmit and receive on multiple channels via infra-red, high frequency RF, and low frequency RF interfaces. These features may be enabled or disabled via a configuration interface. The general input/output ("I/O") interface in this embodiment may also be used to include temperature/motion sensors, GPS capabilities, vibration modes, audio sensing, and gyroscopic/orientation information.

For applications where sufficient power is available, the device described in the present invention may also support communication channels which utilize Bluetooth and 802.11 wireless technologies. The broad range of interfaces and transmission means provide for the implementation of customized remote devices for non-traditional applications of keyless entry systems such as industrial automation, wireless security systems, and control of wireless sensor arrays. In addition, Bluetooth and 802.11 wireless interfaces would allow the device to be controlled via mobile phones that support these wireless technologies.

Furthermore, the present invention solves many of the problems described hereinabove by providing a single keyless entry remote device unit that can be configured to operate alternatively as a variety of remote devices types. The present invention is both less expensive and less confusing for a reseller or car dealer to stock, i.e., a single remote device product or much reduced inventory of remote device products, and reduces the need to maintain a cumbersome compatibility database. The present invention reduces the need for original OEM parts by emulating the functionality provided by the OEM part. In addition, as the present invention is configurable and reconfigurable, a remote device for a particular vehicle will always be available as long as the device and method described in the present invention are available. The present invention also alleviates problems caused by owning multiple vehicles that require individual OEM keyless entry remote devices as it can emulate the functionality of two or more remote devices simultaneously, thereby allowing the consumer to only have to carry a single remote device for all their vehicles. A button may be provided in the remote device to select between vehicles for operation. Furthermore, the present invention improves on existing OEM keyless entry remote device designs by changing the existing basic protocol to a newer, more efficient, software based, digital transmitter platform that improves transmit range and/or battery life compared to the original remote device. Security is also moderately improved through additional obfuscations added to remote device protocols making the protocols harder to clone when received from the present invention. In addition, many advanced convenience features such as motion control or passive entry may be added to remote device systems that never had those features.

In one embodiment, a method and apparatus for creating a single rolling code remote that may be configured to work with multiple makes/models of cars and is fully interoperable with OEM Remote Keyless Entry systems is provided. The method may further comprise implementing a wide range of frequencies, modulation schemes, data payloads, and encryption schemes that are programmed based on vendor profiles that are stored in the device. The apparatus may provide for the altering of the appearance of any external buttons or controls (temporarily or permanently) by a user to better reflect the configured functionality for a vehicle or end device. The method and apparatus may further comprise a keyless entry remote adapted to operate with or control one or more vehicles simultaneously without any user intervention or reconfiguration. The method and apparatus may be further adapted to, for applicable OEM and aftermarket remotes, include additional transmission data to obscure weak or less secure fixed or rolling code protocols. The method may comprise appending dummy data to increase the overall security margin of the remote device by making the target data on the remote device more difficult to reverse engineer or clone. The method and apparatus may further comprise modifying the remote device's configuration data set via an external "configuration tool". The configuration tool may also provide a user with button and function matching utilities to map buttons and functions to the remote device's possible inputs. The method and apparatus may further comprise generating secure pseudo-random sequences for use as unique serial numbers, encryption keys and/or rolling code seeds. The method and apparatus may further comprise a global positioning system ("GPS") services to provide location, time, and motion related information to a user. The method and apparatus may further comprise dynamic antenna shaping via passive and active circuit elements. The method and apparatus may further comprise monitoring the battery condition to adjust RF transmit power based on a detected internal battery voltage.

In another embodiment, a method for selectively programming an RF remote access device is provided. The method may comprise: selecting a set of device configuration profiles from a plurality of device configuration profiles; storing in a memory of the remote access device the selected set of device configuration profiles; and automatically configuring the remote access device based on the selected set of device configuration profiles, whereby the remote access device is configured to: generate an RF signal based on the selected set of device configuration profiles; and transmit the RF signal to an end device associated with the selected set of device configuration profiles to cause the end device to perform a predefined operation.

The embodiment may further comprise the following. The plurality of device configuration profiles may comprise a set of original equipment manufacturer ("OEM") configurations for specific vehicle makes and models. The storing may further comprise storing the set of device configuration profiles by an active learning configuration module, storing the set of device configuration profiles from an other remote access device, manually inputting the set of device configuration profiles. The method may further comprise: selecting the set of device configuration profiles from a plurality of device configuration profiles on a configuration tool; and receiving the set of device configuration profiles from a configuration tool for storing on the RF remote access device. The storing the set of device configuration profiles may comprise receiving the configuration by communication means selected from: a radio frequency communication, an inductive link communication, an infra-red communication, a visible light communication, an ultra-sonic communication, a USB communication, a serial peripheral data communication, an inter-integrated circuit bus communication, and an iWire data communication. The RF signal may be generated based on the selected set of device configuration profiles and an encryption code, and the encryption code may be a rolling code. The remote access device may configured to transmit by a means selected from the group consisting of: a radio frequency transmission, a Bluetooth transmission, an infra-red transmission, a visible light transmission, and an 802.11 wireless transmission. The method may further comprise: storing a first set of device configuration profiles and a second set of device configuration profiles; and selecting the first set of device configuration profiles, whereby the remote access device is configured to: generate an RF signal based on the selected first set of device configuration profiles; and transmit the RF signal based on the selected first set of device configuration profiles to an end device associated with the selected first set of device configuration profiles to cause the end device to perform a predefined operation. The method may further comprise: selecting the second set of device configuration profiles, whereby the remote access device is configured to: generate an RF signal based on the selected second set of device configuration profiles; and transmit the RF signal based on the selected second set of device configuration profiles to an end device associated with the selected first set of device configuration profiles to cause the end device to perform a predefined operation. The method may further comprise automatically configuring a power state of the remote access device based on a first voltage. The method may further comprise encrypting the stored set of device configuration profiles by the remote access device. The remote access device may be further configured to automatically store location information when transmitting the RF signal. The end device may be an automobile and the RF signal causes the automobile to perform one or more of a locking/unlocking function, an engine ignition enable function, a trunk opening function, a remote device recognition, and an alarm function, and the set of device configuration profiles may include a first configuration profile associated with a first automobile and a second configuration profile associated with a second automobile, the remote access device adapted to be configured to generate and transmit a first RF signal to cause the first automobile to perform a predefined operation and to generate and transmit a second RF signal to cause the second automobile to perform a predefined operation, the first RF signal being different that the second RF signal. The set of device configuration profiles may include information derived from one or more of the following vendor-specific properties: transmit and/or receive frequencies, modulation schemes, binary encoding algorithms, data encoding techniques, packet payload templates, and algorithms configured to generate rolling codes to replicate the function of an OEM keyless entry remote device.

In yet another embodiment, a system for selectively programming an RF remote access device is provided. The system may comprise: a reprogrammable RF remote access device comprising a processor, a memory, and a transmitter; and an external device having a configuration memory comprising a plurality of sets of device configuration profiles and a configuration transmitter; whereby: the external device is adapted to transmit by the configuration transmitter a selected set of device configuration profiles to the remote access device; the memory is adapted to store the set of device configuration profiles from the configuration transmitter; the processor is adapted to access the set of device configuration profiles stored in the memory and generate an RF signal based on the set of device configuration profiles; and the transmitter is adapted to transmit the RF signal to an end device associated with the set of device configuration profiles to cause the end device to perform a predefined operation.

The system according to this embodiment may further comprise: wherein the plurality of sets of device configuration profiles may comprise a set of original equipment manufacturer ("OEM") configurations for specific vehicle makes and models; wherein the RF remote access device may further comprise an active learning configuration module; wherein the RF remote access device may comprise a manual input; and wherein the external device may be a remote configuration tool. The RF remote access device may be adapted to receive the set of device configuration profiles by communication means selected from: a radio frequency communication, an inductive link communication, an infrared communication, a visible light communication, an ultrasonic communication, a USB communication, a serial peripheral data communication, an inter-integrated circuit bus communication, and an iWire data communication. The RF remote access device may further comprise an encryption module, and the processor may be further adapted to: retrieve an encryption code from the encryption module, the encryption code associated with the selected set of device configuration profiles; and generate the RF signal based on the set of device configuration profiles and the encryption code. The encryption code may be a rolling code. The transmitter may be adapted to transmit the RF signal by a means selected from the group consisting of: a radio frequency transmission, a Bluetooth transmission, an infra-red transmission, a visible light transmission, and an 802.11 wireless transmission. The RF remote access device may further comprise a selection means, and wherein the memory is adapted to store a first set of device configuration profiles and a second set of device configuration profiles, and the RF remote access device may be further adapted to: receive from the selection means an active set of device configuration profiles selected from the first set of device configuration profiles and the second set of device configuration profiles; generate by the processor a RF signal based on the active set of device configuration profiles; and transmit by the transmitter the RF signal based on the active set of device configuration profiles to a device associated with the active set of device configuration profiles to cause the end device to perform a predefined operation. The RF remote access device may further comprise a power state controller adapted to set a power state of the RF remote access device automatically based on a first detected voltage, an encryption module for encrypting the selected set of device configuration profiles, or a location determination means. The end device may be an automobile and the RF signal causes the automobile to perform one or more of a locking/unlocking function, an engine ignition enable function, a trunk opening function, a remote device recognition, and an alarm function. The set of device configuration profiles may include a first configuration profile associated with a first automobile and a second configuration profile associated with a second automobile, the remote access device adapted to be configured to generate and transmit a first RF signal to cause the first automobile to perform a predefined operation and to generate and transmit a second RF signal to cause the second automobile to perform a predefined operation, the first RF signal being different that the second RF signal. The set of device configuration profiles may include information derived from one or more of the following vendor-specific properties: transmit and/or receive frequencies, modulation schemes, binary encoding algorithms, data encoding techniques, packet payload templates, and algorithms configured to generate rolling codes to replicate the function of an OEM keyless entry remote device.

In yet another embodiment, a selectively programmable RF remote access device is provided. The RF remote access device may comprise: a memory adapted to store a set of device configuration profiles selected from a plurality of device configuration profiles; a processor adapted to access the set of device configuration profiles stored in the memory and generate an RF signal based on the set of device configuration profiles; and a transmitter adapted to transmit the RF signal to an end device associated with the set of device configuration profiles to cause the end device to perform a predefined operation.

The embodiment may further comprise wherein the plurality of sets of device configuration profiles may comprise a set of original equipment manufacturer ("OEM") configurations for specific vehicle makes and models. The end device may an automobile and the RF signal causes the automobile to perform one or more of a locking/unlocking function, an engine ignition enable function, a trunk opening function, a remote device recognition, and an alarm function. The set of device configuration profiles may include a first configuration profile associated with a first automobile and a second configuration profile associated with a second automobile, the remote access device adapted to be configured to generate and transmit a first RF signal to cause the first automobile to perform a predefined operation and to generate and transmit a second RF signal to cause the second automobile to perform a predefined operation, the first RF signal being different that the second RF signal. The RF remote access device may further comprise a selection means, and wherein the memory is adapted to store a first set of device configuration profiles and a second set of device configuration profiles. The RF remote access device may further be adapted to: receive from the selection means an active set of device configuration profiles selected from the first set of device configuration profiles and the second set of device configuration profiles; generate by the processor a RF signal based on the active set of device configuration profiles; and transmit by the transmitter the RF signal based on the active set of device configuration profiles to a device associated with the active set of device configuration profiles to cause the end device to perform a predefined operation. The RF remote access device may further comprise an encryption module.

In another embodiment, the present invention provides a selectively programmable radio frequency ("RF") remote access device, the remote access device comprising: a logic board comprising a processor and at least one memory; a set of user inputs; a transceiver; wherein the memory comprises a first read-only memory comprising a plurality of firmware configurations for the logic board, and a second memory which comprises an active memory partition adapted to store an active firmware configuration; wherein each firmware configuration in the plurality of firmware configurations comprises a set of properties for controlling the processor, the memory, and the transceiver; wherein the active firmware configuration is selected from the plurality of firmware configurations from the first read-only memory by a user and is loaded into the active memory partition of the second memory; and wherein the logic board is automatically configured by the selected firmware configuration loaded into the active partition of the second memory to communicate with an external device via the transceiver.

The system may further comprise wherein each of the plurality of firmware configurations comprise a set of vendor specific properties. The vendor specific properties may comprise one or more of transmit and/or receive frequencies, modulation schemes, binary encoding algorithms, data encoding techniques, packet payload templates, and algorithms configured to generate rolling codes to replicate the function of an original equipment manufacturer ("OEM") keyless entry remote device. The set of user inputs may be adapted to provide for the user selection of a firmware configuration from the plurality of firmware configurations. The transceiver may be adapted to generate an RF signal based on the active firmware configuration and transmit the RF signal to the external device to cause the end device to perform a predefined operation. Each firmware configuration in the plurality of firmware configurations may be associated with a specific external device. The plurality of firmware configurations in the read-only memory may be stored in an encrypted format. The active firmware configuration selected by the user may be decrypted by the processor from the read-only memory prior to being stored in the active memory partition of the second memory. The logic board may comprise an encryption engine. The generated RF signal may comprise a rolling code packet payload.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
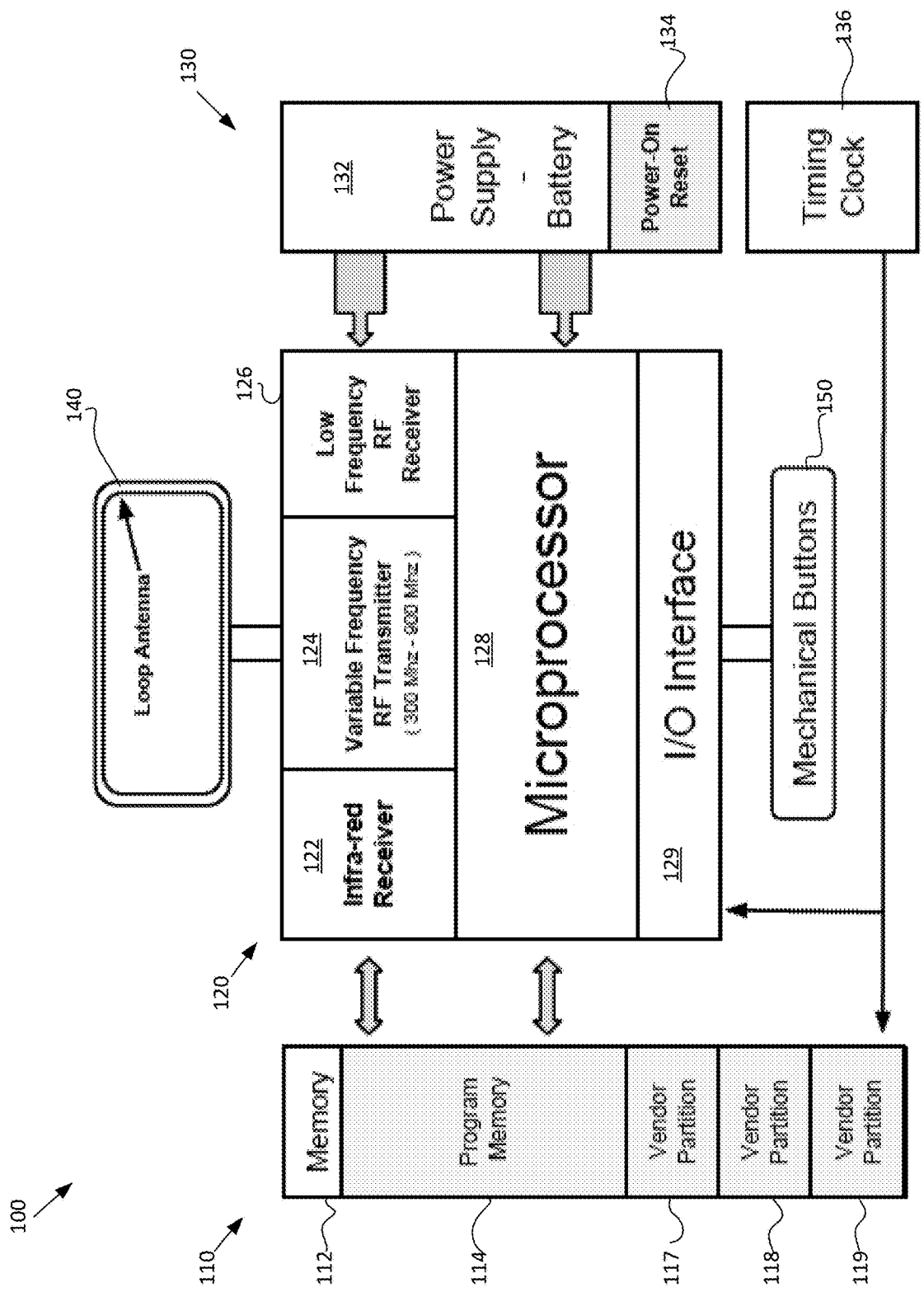
FIG. 1 provides a schematic view of one embodiment for the high level circuit implementation for a rolling code keyless entry device.

With reference to FIG. 1, a schematic view of an embodiment of a remote entry device 100 according to the present invention is provided. The remote entry device primarily comprises a processing unit 120 and as described herein is not limited to "entry" function but may include a variety of key operations. The processing unit 120 of the remote entry device 100 comprises a microprocessor 128, I/O interface 129, infra-red receiver 122, variable frequency RF transmitter 124, and low frequency RF receiver 126. The processing unit is also operatively connected to a loop antenna 140, mechanical buttons 150, power unit 130, timing clock 136, and memory module 110.

The processing unit 120 is comprised of a suitable microprocessor 128 which may be a microcontroller or Application Specific Integrated Circuit (ASIC) having a general processor core, static and volatile memories, hi-resolution timers, standard integrated circuit interfaces, cryptographic acceleration modules, transceiver acceleration and power management features. The static memory in the processing unit may be supplemented by external memory 112 in the memory module 110 in electrical communication with the processing unit. External memory 112 in the memory module 110 may be high capacity and/or high security and tamper resistant. This type of memory provides a greater security margin to both the user and the operation of device 100. The system timing may be provided by a timing clock module which may be a separate module 136 or may be integrated into the microprocessor 128. The system timing signals are used to control the state of the memory module 110, I/O interface 129, the microprocessor 128, and the transmitter 124 and receivers 122 and 126. The I/O interface 129 de-bounces the signals from the mechanical buttons 150 but is also a general purpose interface for other devices that may be connected to the remote entry device 100.

The memory module 110 may comprise two primary forms of data: the active configuration and possible configurations. The active configuration is stored within the program memory 114 that is easily accessible for the processing unit 120. This block of data describes how the remote entry device 100 should behave when asked to perform a remote access emulation task. In addition, information related to active rolling code seeds, encryption keys, and other sensitive information may be stored in separate, protected areas of the memory module 110 such as vendor partitions 117, 118, and 119.

Possible configurations stored in memory module 110 will vary depending on the implemented method of configuration. For standalone applications with user inputted configuration, all possible configuration data will need to be stored. When a configuration tool is used or the system is intentionally limited to a small number of remote devices, the possible configuration memory may be very small or even not implemented. In either case, the possible configurations will be organized in vendor partitions 117, 118, and 119 based on remote device technology. Vendors or manufacturers with similar functioning remote devices will be combined to meet a lowest common denominator of functions and features with extra functions available on a per remote device basis. This grouping allows for configuration data to be optimized for storage and for efficient retrieval for processing. A possible configurations may also be referred to as a set of device configuration profiles. A set of device configuration profiles may be one or more profile. A grouping of sets of device configuration profiles may contain one or more sets of device configuration profiles.

The required amount of memory to store possible configurations may vary between 0-bits for tool configured remote device system to many megabits for stand-alone field configured remote devices. Memory requirements may also be dictated by which vendor profiles are included in a particular implementation. Exemplary information that may be stored in a vendor profile is provided below in Table 1.

TABLE 1

| Data Type | Data Stored |
|---|---|
| VendorID | Vendor ID information |
| Remote Device Configuration | Available Remote Device Functions |
| | Button Map |
| | Button Behavior Configuration |
| | LED/Feedback Configuration |
| | Button Function Codes |
| | Advanced Remote Device Control Configuration |
| Packet Formatting | Serial Number Configuration |
| | Payload Type ID and format |
| | Rolling Code Hopping Mode |
| | Required Preamble/Postamble |
| | Error Correction Mode |
| | Encryption Type |
| | Pairing Mode |
| | Padding/Dummy Data Configuration |
| Transmitter Configuration | Transmit Channel (RF, IR, etc) |
| | Modulation Mode |
| | Data Encoder Mode |
| | Transmitter Data Rate |
| | Transmitter Frequency Configuration |
| | Transmitter Power Level |
| | Function Codes |
| Advanced Functions | LF Transponder Configuration |
| | Passive Entry Configuration |
| | Location Based Access |

The processing unit 120 runs custom application code that supports managing I/O, generation of emulated remote device data, changing remote device configuration, interfacing with communication interfaces, and other advanced features. The application code is stored either in the non-volatile memory in the microprocessor 128 or in external memory 112. The application code can be updated at any time to support new remote device configurations, new features and fix problems. Updated application code may or may not affect the current remote device configuration.

The variable frequency RF transmitter 124 provides the processing unit 120 with the ability to send and receive data from entities that are not the user. These other entities can include a target vehicle access system, a remote device configuration tool, another compatible remote device, global positional systems, or other acceptable data sources.

In one embodiment, the variable frequency RF transmitter 124 may be a highly configurable, frequency agile, ISM band transmitter. Using a standard data interface, the processing unit 120 can enable, configure, and pass data through this transmitter such that it matches the original transmission of an OEM or aftermarket vehicle remote device. For more advanced functionality, a receiver 126 may be added to create a full transceiver. The transmitter 124 features a wideband configured loop antenna 140 compatible with the full range of transmit frequencies of the emulated remote devices. The loop antenna 140 may be optionally integrated into the processing unit 120. The antenna circuit may tested and configured for optimal transmit power. The frequency of the transmission by the RF transmitter 124 may be dynamically adjusted. The RF transmitter 124 is frequency agile. The loop antenna 140 may be dynamically adjusted and the RF transmitter's 124 parameters may be changed to optimize performance via a matching network that optimizes impedance from the RF transmitter 124 to the loop antenna 140. By utilizing the matching network and by optimizing the impedance an optimal transmission signal is obtained. Furthermore, this optimization suppresses the transmission harmonics and filters unwanted transmission frequencies. The transmission frequency range modified in this manner is dynamically adjustable, e.g., it may be set to any frequency in a range from 300 MHz-860 MHz. In contrast to known fixed frequency remote devices, the frequency adjustment feature provides the remote device 100 with the ability to work with, for example, cars in American, European, and Asian markets in addition to serving as a filter for unwanted frequencies. An infra-red receiver 122 may also be added to provide for the processing unit 120 to receive infra-red signals.

The remote entry device 100 also comprises a power unit 130. The power unit 130 comprises a power supply/battery 132 and a power on reset module 134. In another embodiment the remote entry device 100 may be powered by line power instead of by the battery 132. The processing unit 120 will place the remote device in a low-power standby or sleep mode when not executing a remote access or configuration. User input (passive or active) will wake the remote device from its low power mode to execute the desired function. For more advanced functionality, the remote device unit may wake up periodically based on low power timers (without any user input) to execute functions.

The remote device may have a power-on reset system 134 and/or brown/out reset system to maintain data integrity of the remote device even in the case of an inadequate power supply. The processing may alert the user via an output interface that the remote device battery is low or faulty and requires attention.

Generation of a rolling code is performed by the microprocessor 128. In one embodiment, the rolling code is transmitted as a binary data stream. The binary data stream is assembled based on protocol information stored in the remote device configuration memory which may either be integrated into the microprocessor 128 or may be stored in the external memory 112. Each protocol will be made up of different binary components that will vary on content and behavior based on the remote device to be emulated. Components such as preambles, serial numbers, and functions codes will remain mostly fixed for most protocols. Conversely, components such as rolling codes, encrypted codes, and checksums will vary frequently if not with every user input. The processing unit 120 retrieves from memory or generates such components as dictated by the protocol.

Figure 13:
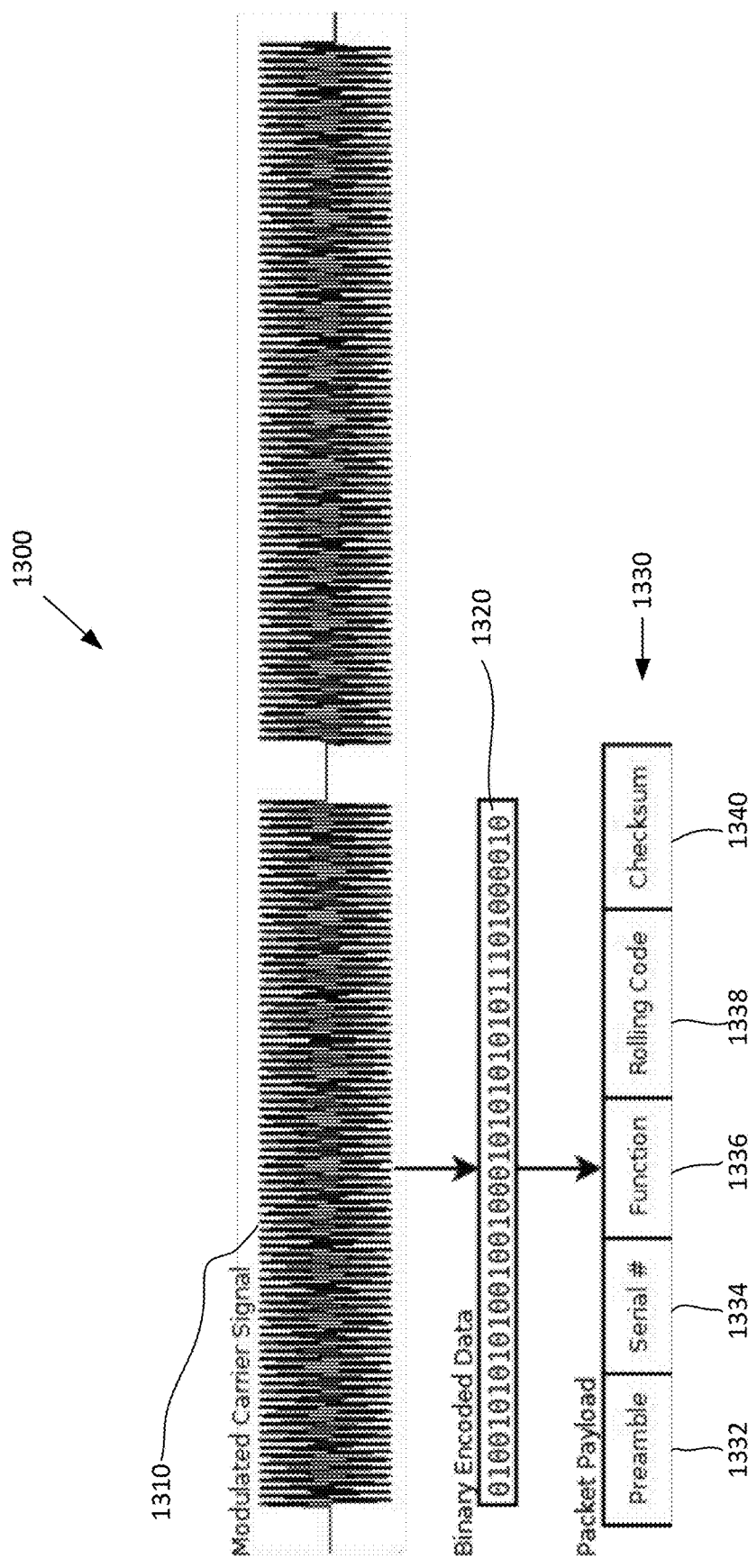
FIG. 13 provides a diagram of one embodiment of a binary data stream transmission using RF transmission schemes.

One embodiment of a typical binary data stream as transmitted is shown in FIG. 13. The diagram 1300 shows the modulated carrier signal 1310 as an RF transmission. The modulated carrier signal 1310 is an ISM band (315 MHz, 434 MHZ, etc) signal that has been modulated via OOK, ASK, FSK, PSK, etc to carry the binary encoded data 1320. This binary encoded data 1320 makes up one or more packet payloads 1330 that hold all the information needed by the vehicle to calibrate, authorize and execute a remote access function requested by the user. The packet payload 1330 may comprise a preamble 1332, serial number 1334, function 1336, rolling code 1338, and checksum 1340. Vendors use a wide range of packet payload formats so the proposed device must be able to generate the required payload for a specific manufacturer. The vendor profiles are referenced to determine the type of payload that will be transmitted.

With reference again to FIG. 1, rolling codes and encrypted values are generated as need by the processing unit 120. The processing unit may make use of cryptographic modules to accelerate the generation process. These modules provide support for standard cryptographic primitives and protocols or may be custom and proprietary acceleration blocks. Rolling code and encryption operation not performed in dedicated modules will be performed by application code.

The processing unit 120 tracks remote code generation and stores any increments or changes to the rolling code or encryption system with each button press. Rolling code or encryption algorithm behavior is specified in the remote device protocol currently selected.

Proper timing of the binary data stream is achieved using hi-resolution timers that are part of the processing unit 120. Precision timing is maintained by either a crystal or RC oscillator in the microcontroller/ASIC or external.

Typical operation of the remote entry device 100 has the user engage one of the input elements such as mechanical buttons 150 (or the remote device unit is passively activated by an input). The I/O interface 129 will typically comprise inputs, such as mechanical buttons 150, and outputs. Inputs elements allow the end user to actively or passively affect the functional behavior of the remote device 100 including configuration operations, pairing commands, and remote access. Output elements relay useful information to the end user about the status of the vehicle, remote device configuration, pairing procedures, battery level, and result of remote device access commands.

The input elements of the remote device may have generic markings for certain common remote device access functions or the user may have the options of customizing the inputs to best match the functionality. The input and output elements are linked to the processing unit 120 that can process input requests and respond with output information as well as send and receive information via the remote device's communication interfaces. The processing unit 120 stores information relating to current and possible remote device configuration, remote device status, and vehicle status. Input elements are actively filtered or debounced by the processing unit 120 to provide clean, reliable user input.

If the input from a user is valid based on the current remote device configuration, the processing unit 120 accepts it and processes a functional request. The processing unit 120 may then relay information back to the user, use the communication interfaces to do a data transaction with another entity, or both. Functional requests from user input are classified as either remote access or configuration. Remote access requests are the convenience and management functions the remote device 100 is currently configured to perform. These include both the original functions of the OEM remote device the remote device 100 is currently emulating and any new functions added. Configuration functions are those that cause the processing unit 120 to alter how it responds to remote access requests.

Remote device functionality is not limited to direct emulation of car access function, but may also include security transponders, passive entry, and other vehicle or non-vehicle related functionality. Remote device emulation tasks require the processing unit 120 to execute, e.g., the following set of standardized emulation routines:

1. Retrieve the current remote device configuration and status from non-volatile memory, either the integrated memory in microprocessor 128 or the external memory 110.

2. Configure the RF transmitter 124 for the proper frequency, power level, modulation scheme, and data rate via standard data interface.

3. Generate or retrieve any required fixed, rolling, or encrypted codes using cryptographic modules or subroutines.

4. Assemble a complete binary stream of remote device data to be transmitted and stored in volatile memory.

5. Pass the binary stream through the transmitter with proper timing via a data interface.

6. Based on the remote device configuration, monitor the user input and repeat any required part of transmission as long as input is maintained active or end transmission after a certain interval.

7. Update any rolling code counters for the protocol.

8. Place remote device 100 into sleep mode.

For any remote access operation that requires the remote device 100 to receive data from the target vehicle, the processing unit 120 will configure the receiver, receive data, decode it, and generate the necessary response behavior based on the remote devices protocol.

Figure 2:
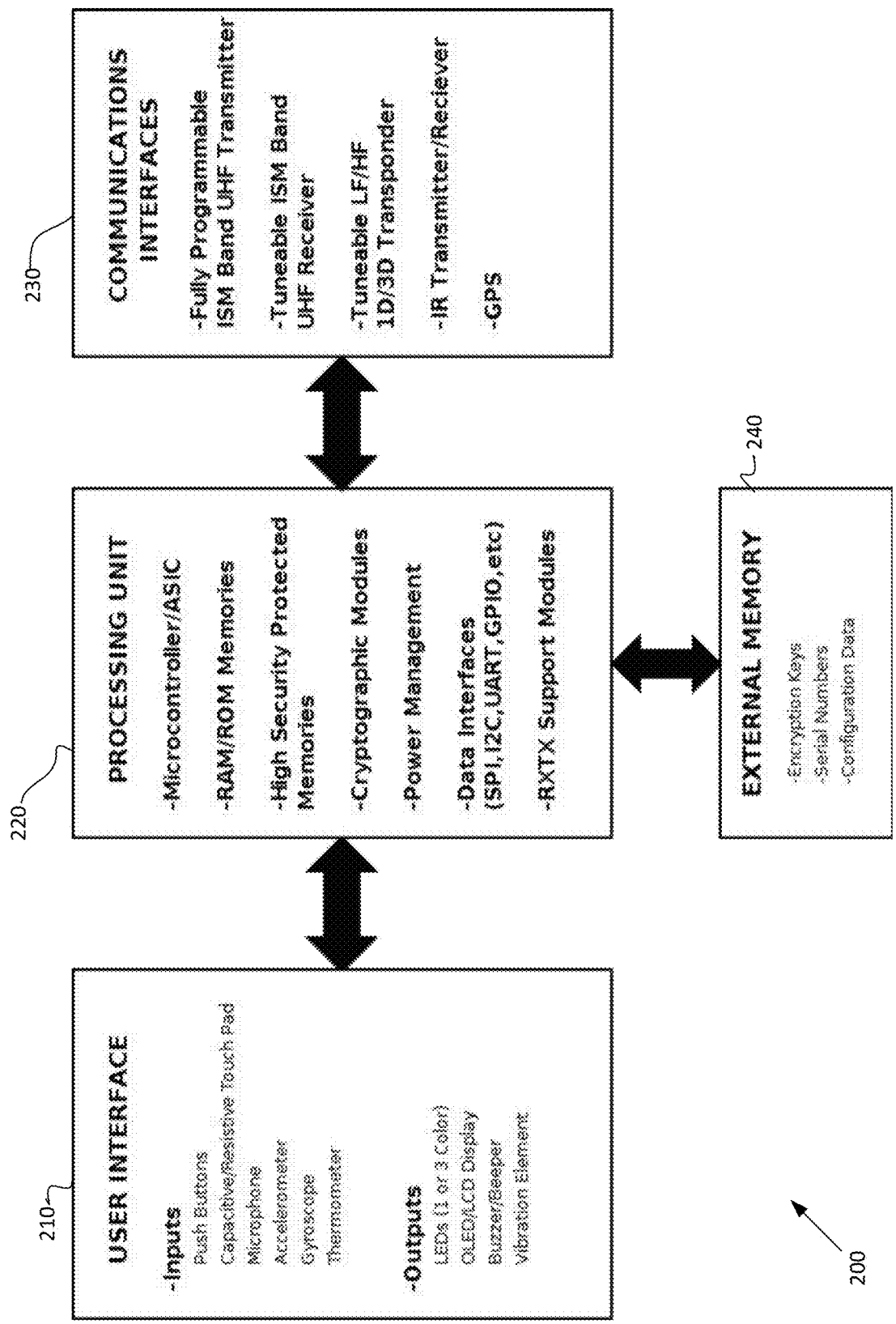
FIG. 2 provides a diagram of the typical functions of a rolling code keyless entry device.

With reference now to FIG. 2, a block diagram 200 of one embodiment of the typical functions of a rolling code keyless entry device is provided. The diagram 200 depicts the various functional elements of a rolling code locking system, specifically the user interface 210, the processing unit 220, the external memory interface 240, and the various communication interfaces 230 that may be implemented. The interfaces that are implemented are application specific and may vary across products. The user interface 210 may comprise both inputs and outputs. The inputs for user interface 210 may include a set of push buttons, capacitive/resistive touch pad, microphone, accelerometer, gyroscope, and thermometer. The outputs for the user interface 210 may include LEDs that may comprise one or more color, an OLED/LCD display, a buzzer or beeper, a polyphonic speaker, and a vibration element. The processing unit 220 may comprise a microcontroller/AISC, RAM/ROM memories, high security protected memories, cryptographic modules, power management modules, data interfaces (e.g., SPI, I2C, UART, GPIO), and RXTX support modules. The communications interfaces 230 may comprise a fully programmable ISM band UHF transmitter, a tune-able ISM band UHF receiver, a tune-able LF/HF 1D/3D transponder, an IR transmitter/receiver, and a GPS module. The external memory 240 may comprise RAM/ROM memories, solid state memory banks, magnetic memory banks, and may store encryption keys, serial numbers, and configuration data.

Figure 3:
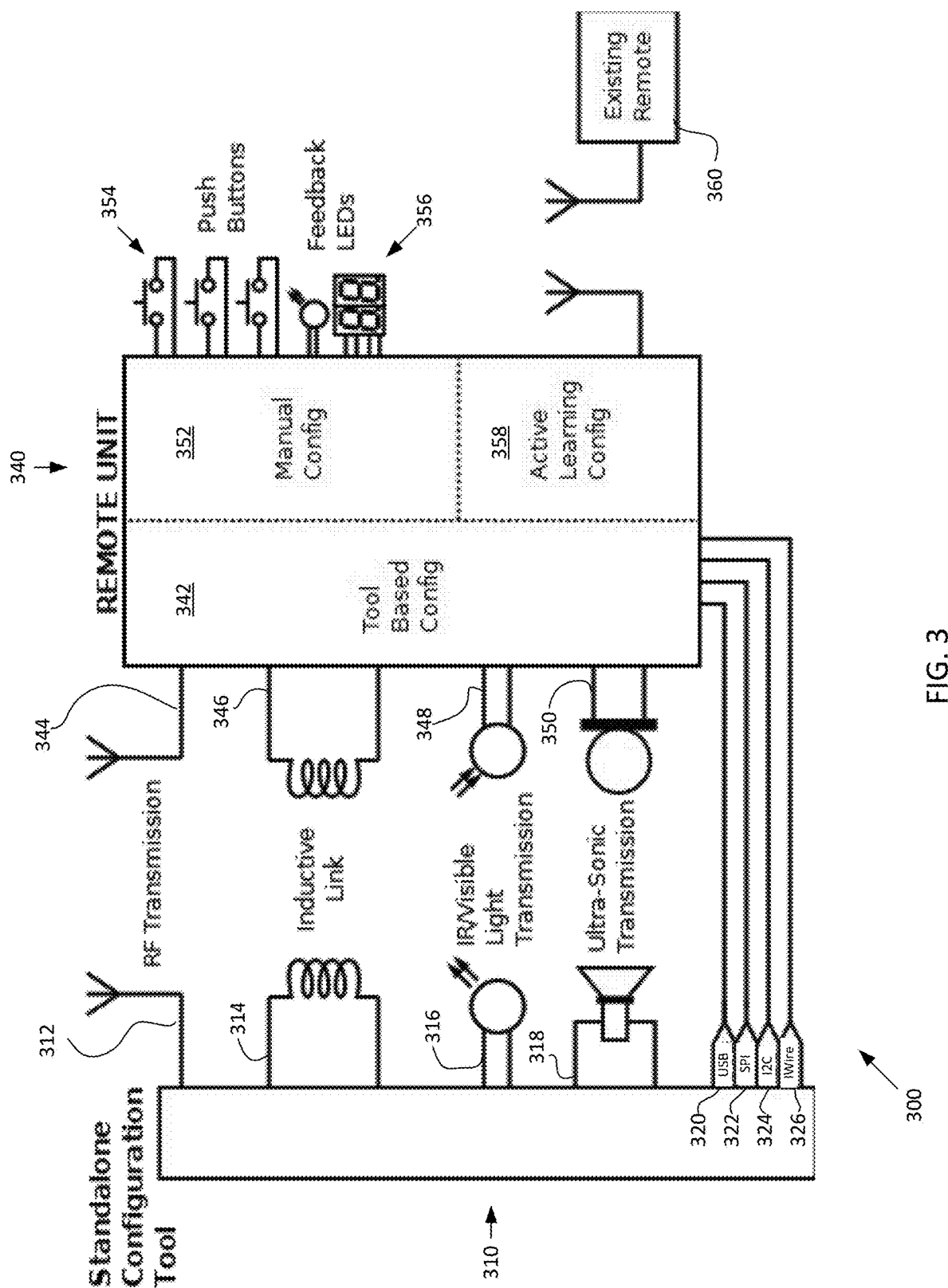
FIG. 3 provides a schematic diagram of an embodiment of an external device that may be used to program, configure, or reconfigure a rolling code keyless entry device.
Figure 4:
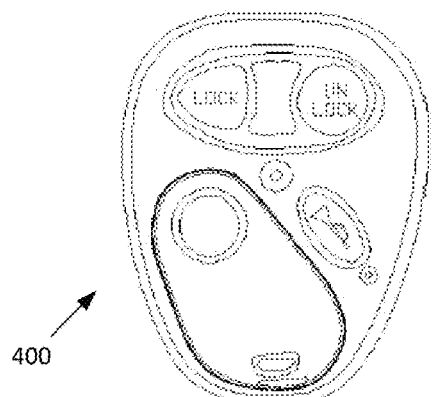
FIG. 4 provides a plan view of an embodiment of a keyless remote entry device.
Figure 5:
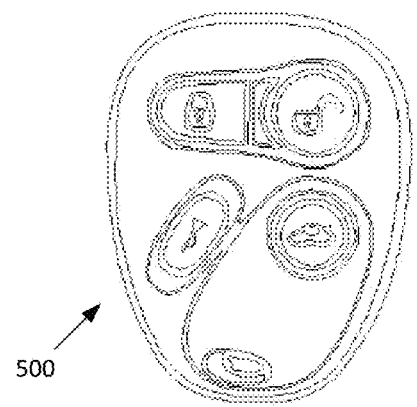
FIG. 5 provides a plan view of an embodiment of a keyless remote entry device.
Figure 6:
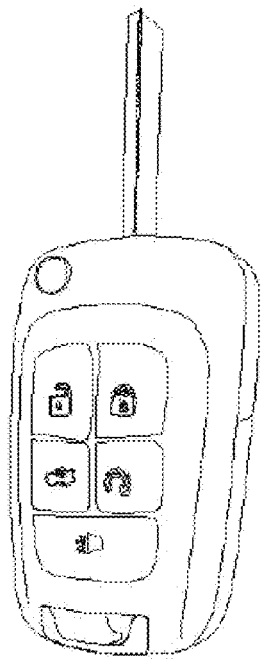
FIG. 6 provides a plan view of an embodiment of a keyless remote entry device.
Figure 7:
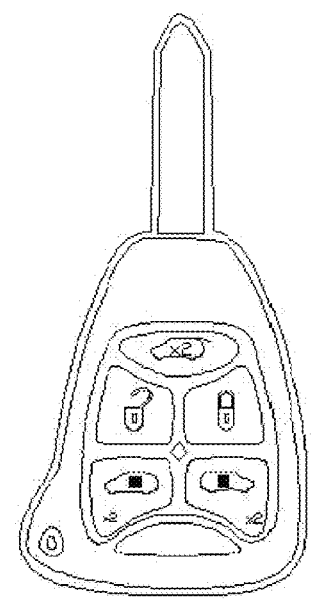
FIG. 7 provides a plan view of an embodiment of a keyless remote entry device.
Figure 8:
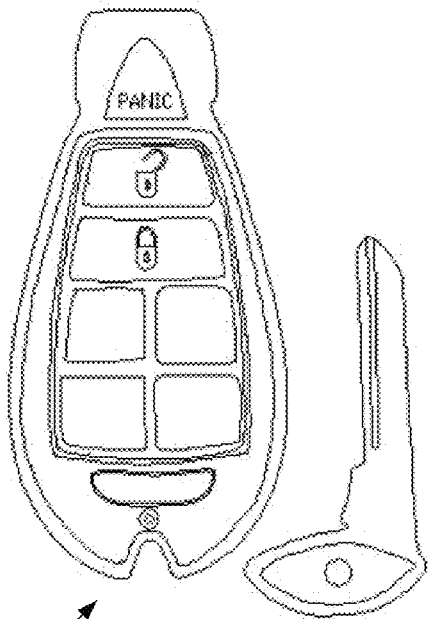
FIG. 8 provides a plan view of an embodiment of a keyless remote entry device.

With reference now to FIG. 3, schematic diagram 300 represents one exemplary embodiment of an external configuration tool or device 310 that may be used to program, configure, or reconfigure a rolling code keyless entry device 340. The diagram 300 shows a collection of many of the possible methods of configuring the remote device 340. In a typical implementation only one or at most two methods would be available. The external device 310 would typically comprise at least one of an RF transmitter 312, inductive link 314, IR transmitter/receiver 316, and ultrasonic transmitter 318. The external device 310 may also be operatively connected to the keyless entry device 340 through a USB interface 320, SPI interface 322, I2C interface 324, or IWire interface 326 present on both the external device 310 and keyless entry device 340. FIG. 3 depicts the three main modes for configuring the device 340, the tool based approach, active learning configuration, and manual configuration.

The configuration interface for the remote device 340 may be either a user interface such as push buttons 354 or may be a configuration tool such as external device 310. Configuration tasks require the processing unit of the remote device 340 to execute, e.g., the following set of standardized setup routines:

1. Check if configuration command was read or write. Reply with current configuration if read, proceed to 2. if write.
2. Receive write password from configuration interface.
3. Check that no write restrictions have been placed on the remote device configuration.
4. Receive configuration data from external device 310 or pull data from possible configuration datapool.
5. Verify configuration integrity and confirm reception of data to configuration interface.
6. Generate any unique serial numbers, seed values, or encryption keys.
7. Store those keys, serial numbers, and serial numbers.
8. Place processing unit and transmitter into sleep mode.

This configuration may be performed in any of the three previously mentioned configuration modes. When using the tools-based approach custom hardware may be used to program the device 340 through the tool-based configuration module 342 using RF transmitter/receiver 344, inductive link 346, IR or visible light transmitter/receiver 348, or ultra-sonic transmitter/receiver 350. When the remote device 340 is part of a tool-based configuration scheme, the user or an authorized agent of the user (e.g. a locksmith) can setup the remote device using a stand-alone tool, such as external device 310, of variable complexity. The external device 310 may have a computer interface or be fully standalone. The external device 310 may be battery powered or require an external power source. The external device 310 may have flexible limitations to how it may configure remote devices. The external device 310 may be operatively connected with the remote device 340 over a wide range of interfaces including but not limited to: direct electrical connection using a standard data interface such as USB 320, SPI 322, I2C 324, UART 326, etc or a custom electrical interface, this interface may encrypt the configuration data; RF transceiver 312 using either frequencies related to the emulated remote devices or unrelated frequencies of convenience; inductively coupled data link 314 similar to RFID, this approach does not require the remote device 340 to have a battery present at configuration as power can be provided via the inductive link 314/346; an ultrasonic emitter and transducer link 318; or an IR/visible LED emitter and photodiode link 316. The external device 310 may allow for a large amount of data to transferred in the remote device setup process. The external device 310 may change or add to every aspect of the remote device configuration up to and including the firmware of the remote device itself.

In the manual configuration mode a user or a technician configures the remote device using the mechanical interfaces such as push buttons 354 that are operatively connected to the manual configuration module 352. In manual configuration mode, feedback may be provided to the end user through, for example, the feedback LEDs 356.

When the user interface, e.g., push buttons 354, is also the configuration interface, the remote device will be provided to the user in a neutral state with no configuration information present in memory. The user can then use the available input elements to enable configuration mode, enter the configuration password, and enter the desired vendor profile code. The user output elements such as feedback LEDs 356 will confirm if the configuration process was successful. Manual configuration will not allow the user to specify any remote device protocol details as these are stored in the possible configurations memory. The user may only specify a short vendor/protocol code.

In one embodiment, a special case of the manual configuration process is a remote device implementation that can learn its configuration information from another remote device. This is called active learning mode. In active learning mode, the active learning configuration module 358 is "trained" using data from an existing remote device 360. In active learning mode, the remote device 340 is placed in configuration mode by the user and the remote device monitors for an RF signal. Based on the received signal, the remote device 340 sets all the necessary configuration memory values to match the protocol of the target key. Once the complete RF signal (or signals) are received, the remote device 340 gives the user an indication via feedback LEDs 356 of whether or not it was able to successfully configure itself.

With reference now to FIGS. 4, 5, 6, 7 and 8, plan views of several form factors of OEM keyless entry remote devices are depicted. Keyless entry remote devices are available in a wide range of form factors. The OEM devices 400, 500, 600, 700, and 800 represent some of the devices the present invention may emulate. FIGS. 4, 5, 6, 7 and 8 show some of the more popular types of keyless entry remote device. The OEM device 400 and OEM device 500 represent typical RF remote device access units. OEM device 600, OEM device 700, and OEM device 800 are remote device units with integrated key blades of varying styles. The present invention may be implemented in any these form factors. The external cases may also be customized for various markets and applications.

Figure 9:
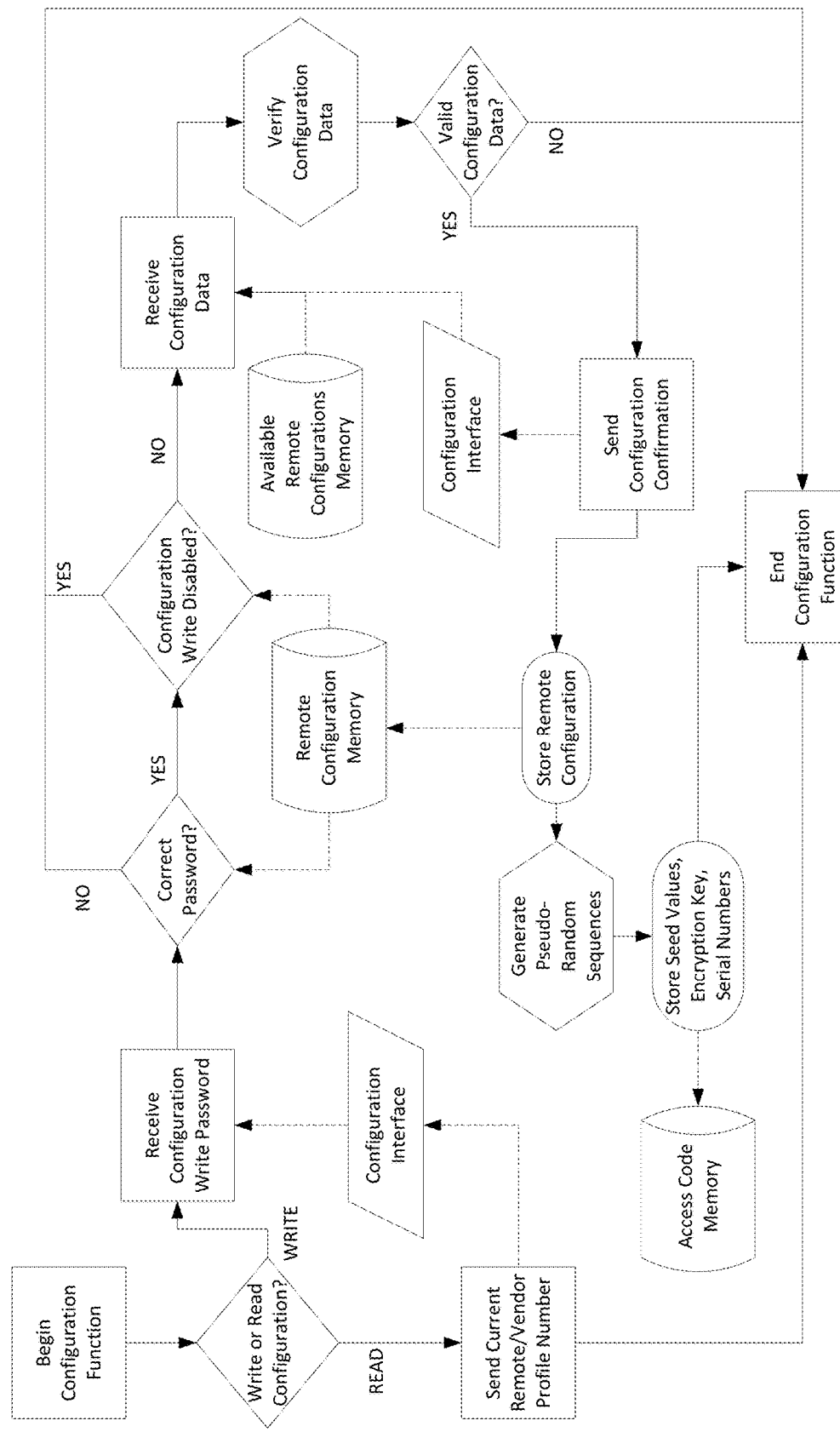
FIG. 9 provides a flowchart depicting one embodiment of the process for managing configuration requests of a rolling code keyless entry device.

With reference now to FIG. 9, a remote device configuration application code flow chart 900 depicts one embodiment of how a remote device as described in the present invention may handle the processing of configurations requests for various configuration modes and interfaces. The actual flow will depend on the hardware interfaces that are present for communicating the configuration settings to the remote device. In one embodiment, the configuration function begins with the remote device determining if the configuration is being read or written. If it is being read the device sends the current profile information and the configuration function returns to the interface and ends. If a write configuration is being performed, a password may need to be entered. If correct, and configuration writing is enabled, the new configuration data is received by the remote device. If incorrect, or if configuration writing is disabled, the function is ended. This determination is made by retrieving information from the remote device memory. The configuration data is verified by the remote device and if valid, the configuration confirmation is sent to the interface and the configuration is stored in memory. After the configuration is stored pseudo-random sequences are generated, if needed, and these values are stored in the access code memory and the configuration function is ended.

Figure 10:
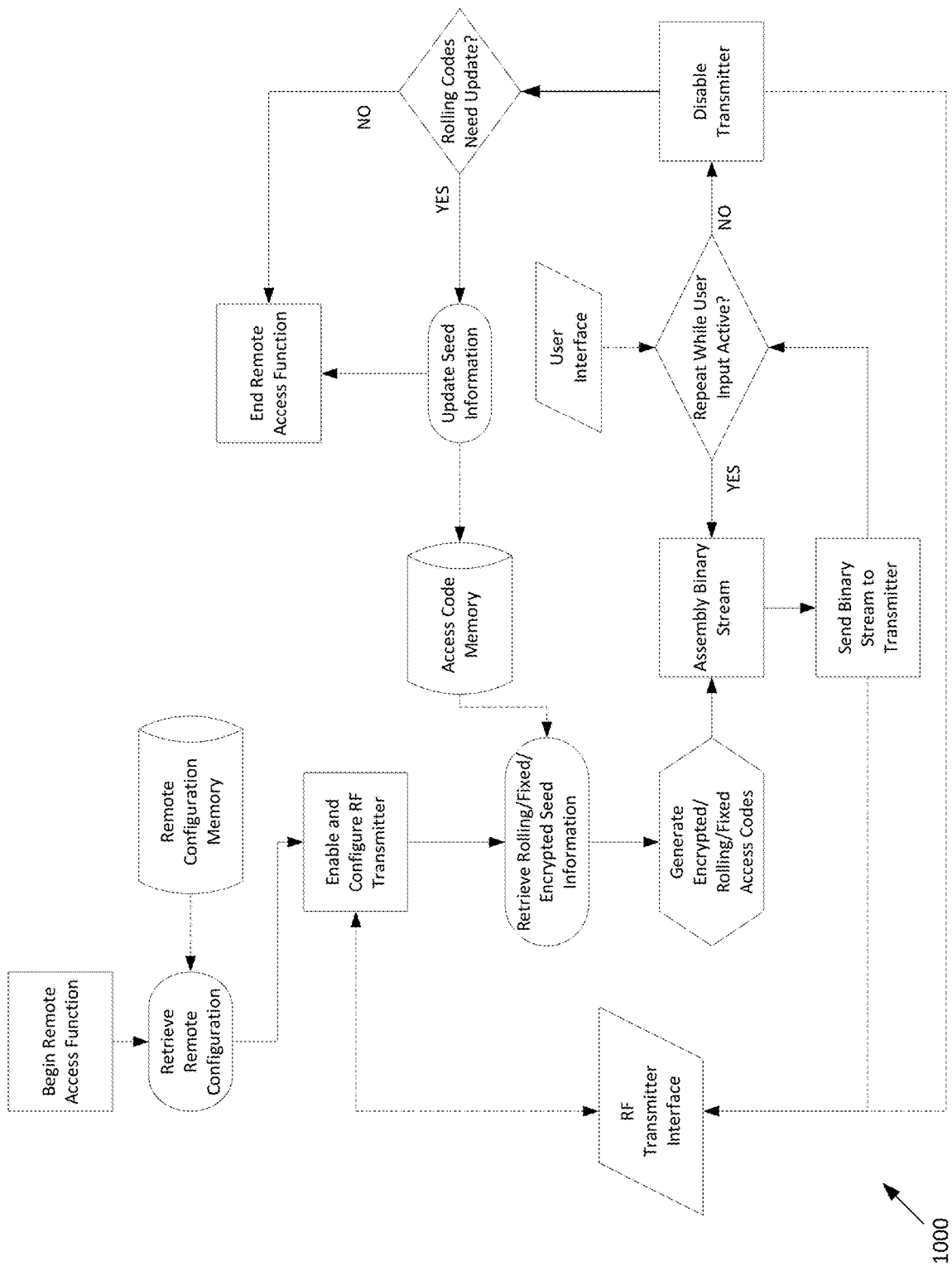
FIG. 10 provides a flowchart depicting one embodiment of the process for managing access requests to a rolling code keyless entry device.

With reference now to FIG. 10, a remote device access application code flow chart 1000 depicts one embodiment of how a remote device as described in the present invention may handle, in general, the processing of remote device access requests. Flow chart 1000 also shows how the transmitter is activated in response to an access event and how the data payload is assembled. In one embodiment, a remote device access request is sent and the remote device configuration is retrieved from the remote device configuration memory. The remote device's RF transmitter is configured based on the remote device configuration. Any necessary rolling code seed information or other encryption or code information is retrieved from the access code memory and the necessary code is generated. A binary stream containing any necessary code and the remote device access function is assembled and sent to the transmitter to be sent to an end device. The function may be repeated, and if not the transmitter is disabled to save power. After the transmitter has been disabled, any code seed information may be updated and stored and the access function is ended.

Figure 11:
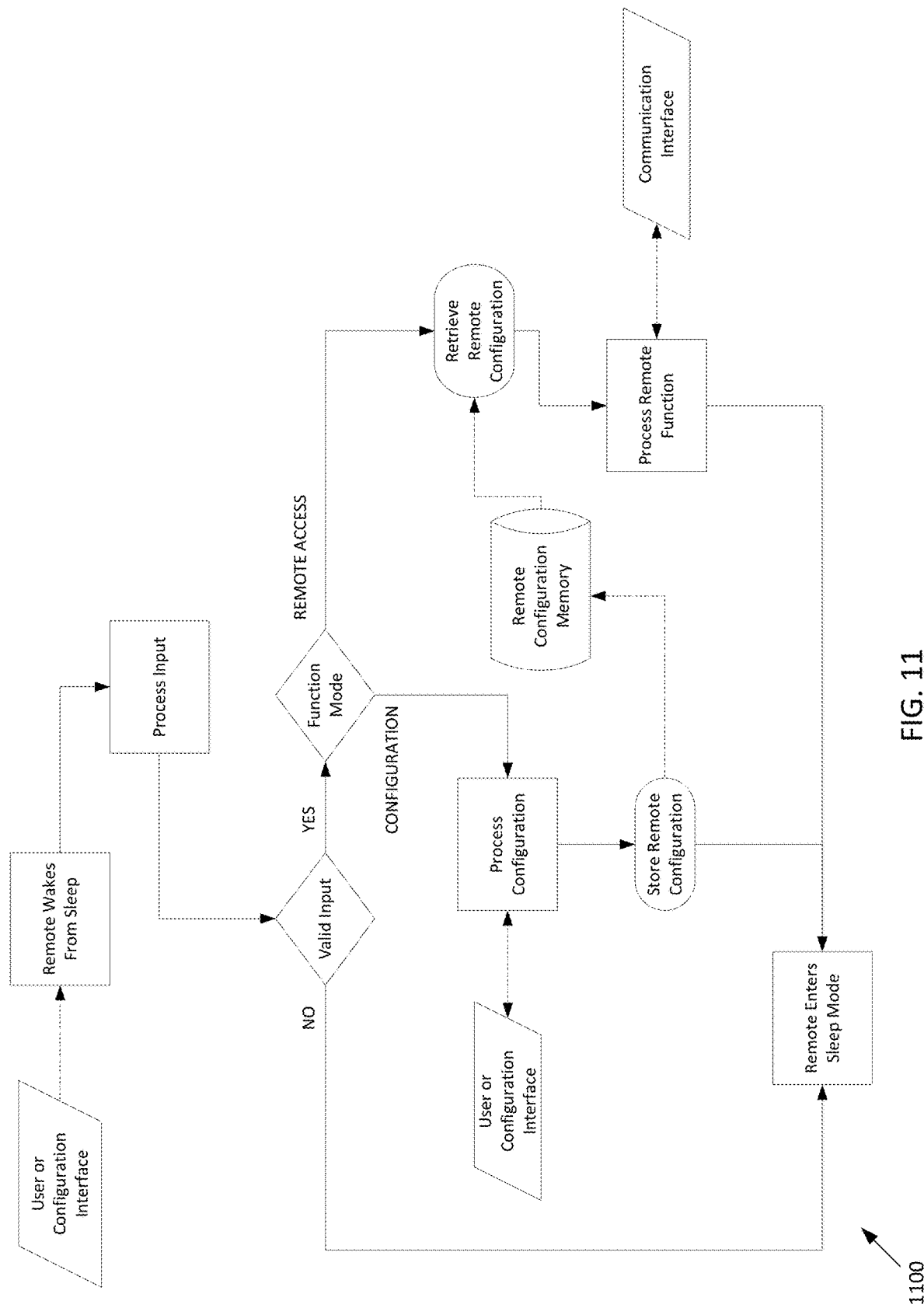
FIG. 11 provides a flowchart depicting an overview of the operational modes of one embodiment of a rolling code keyless entry device.

With reference now to FIG. 11, a flow chart 1100 describes one embodiment how a remote device as described in the present invention may wake from lower power sleep, processes requests, and then power down. In one embodiment, a configuration interface input is received and wakes the remote device from sleep. The input is processed and if valid the remote device enters function mode, if invalid the remote device returns to sleep. The function mode determines if the input is for configuration or remote device access functions. If for access, the necessary configuration is retrieved from the configuration memory, processed, and sent to the communication interface according to the exemplary process depicted in FIG. 10. If for configuration, the configuration request is processed according to the exemplary process depicted in FIG. 9.

Figure 12:
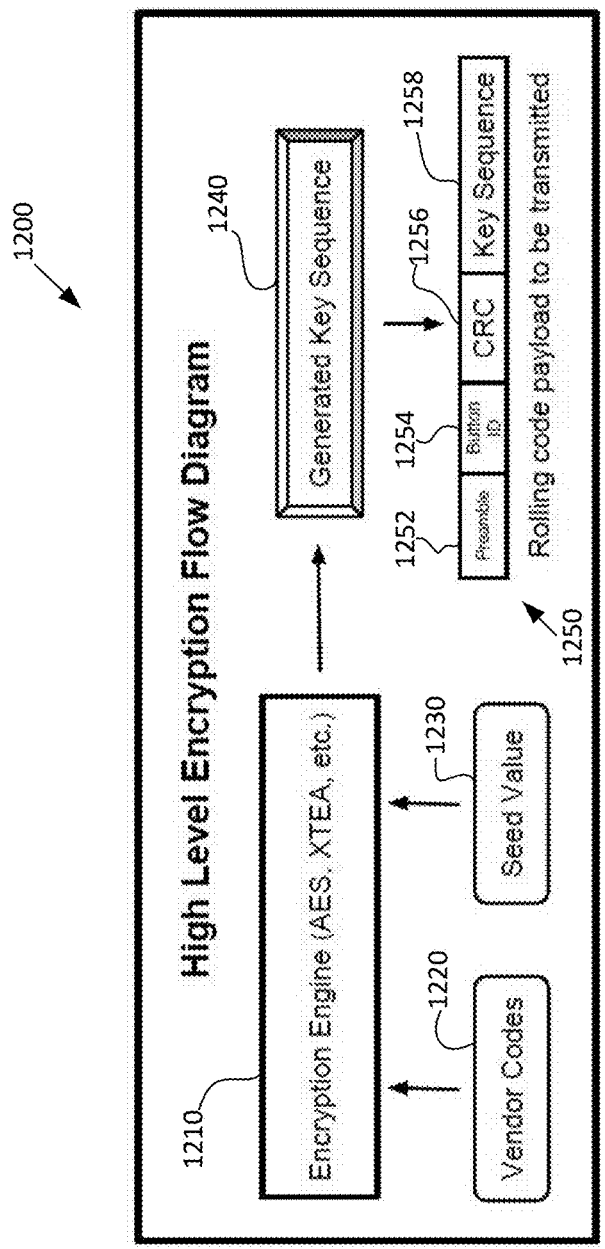
FIG. 12 provides a flowchart depicting one embodiment of an encryption process.

With reference now to FIG. 12, a flowchart 1200 depicting one embodiment of an encryption process is depicted. The flowchart 1200 depicts one embodiment of how stored seed values 1230 and vendor data 1220 may be used to generate encrypted sequences 1250 for insertion into the larger remote device access payload. The encrypted sequences 1250 may comprise a preamble 1252, a button ID 1254, a CRC 1256, and a key sequence 1258. Once generated by the encryption engine 1210 based on the vendor code 1220 and seed value 1230, these encrypted sequences 1250 may then be used to uniquely authenticate the remote device and allow the remote device function to execute. In typical applications, a vendor code 1220 and numeric seed value 1230 are used to generate the security key sequence 1258. The key sequence 1258 is then formatted as payload data that is transmitted via an RF transmitter.

Figure 14:
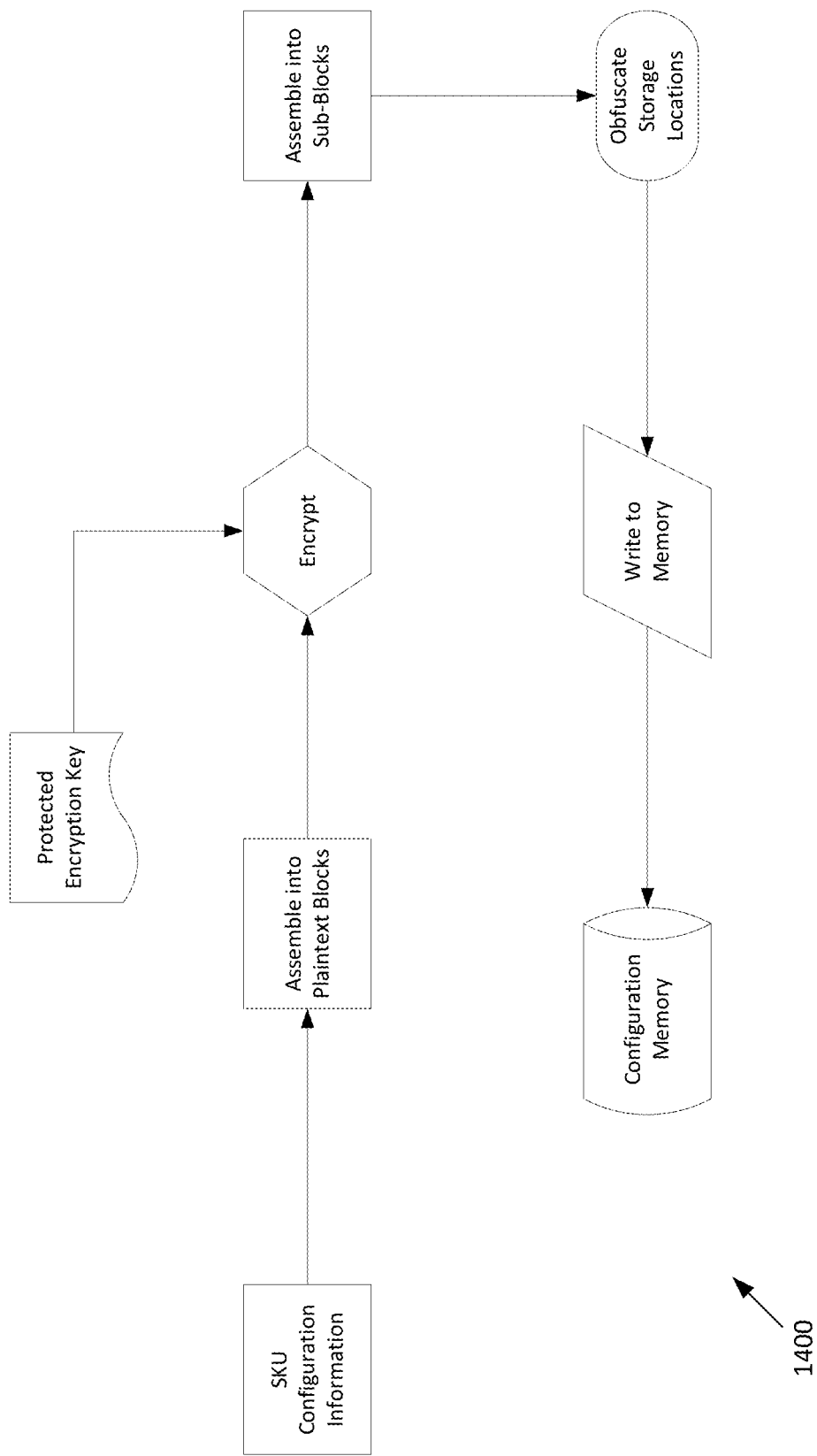
FIG. 14 provides a flowchart depicting one embodiment of a method for securely storing encryption blocks to memory.
Figure 15:
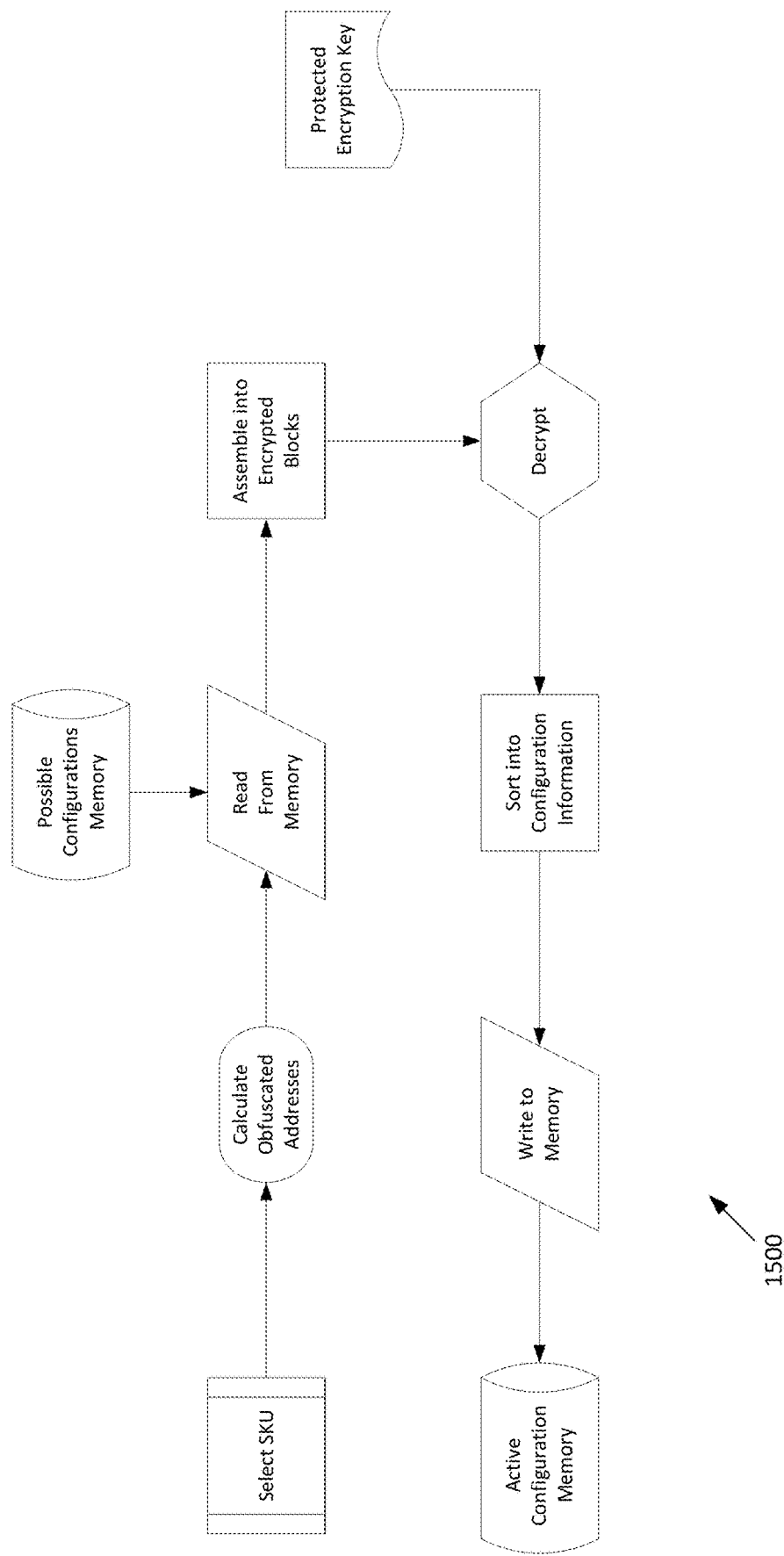
FIG. 15 provides a flowchart depicting one embodiment of a method for retrieving a selected configuration block from memory.

With reference now to FIGS. 14 and 15, flow charts 1400 and 1500 depict one embodiment of how configuration blocks may be stored in and retrieved from memory respectively. All Possible configuration data will be stored securely to prevent leakage of secret or proprietary information that could result in the compromise of the security for one or more remote devices. Blocks of configuration information will be encrypted using industry standard block ciphers with a key stored securely in the processing unit. Encrypted blocks are then stored as sub-blocks distributed to pseudo-random addresses throughout the memory. The sequence of these addresses can be unique to each remote device. Obfuscating the storage of the data prevents a bulk retrieval of data from the memory from yielding information about how remote devices may be configured. This process is shown in the process in flow chart 1400 in FIG. 14.

At configuration, once a SKU is selected, the processing unit calculates the obfuscated addresses for the configuration information of the SKU and reads the data in those addresses. The possible configurations memory stores this data. Those sub-blocks are reassembled into encrypted blocks and a decryption process is applied using the key stored in protected memory. This plaintext configuration information is then sorted and then stored in protected active configuration memory within the remote device until another configuration event is initiated. The configuration recovery processes is shown in flow chart 1500 in FIG. 15.

With reference again to FIG. 14, the flowchart 1400 depicts one embodiment of a process that may occur during development and product assembly, well prior to the end user having possession of the remote. The set of OEM remote SKU configuration information is a possible set of remote setup procedures for all the remotes supported by a particular remote device. This information may be created during the development process for a particular remote device and may be, for example, binary data created specifically to be interpreted by a remote device's microprocessor. The SKU configuration information may be stored in the configuration memory.

This information is efficiently packed according to a specific algorithm or compression technique (e.g., byte/bit alignment) into blocks so that it can be more easily manipulated by the encryption system. The SKU configuration information is then encrypted to protect it from attackers/counterfeiters. However, the encryption process best protects the data set if the encryption key is not known to the attacker. As an extra layer of protection, the encrypted data may be arranged into sub-blocks, which by default are "inorder", and shuffled, rearranged, or reorganized according to an encryption algorithm to place the sub-blocks into an "outoforder" sequence. This shuffling or reordering may be performed by a hidden or secret pseudorandom sequence algorithm. The pseudorandom sequence is configurable such that every remote device may have a different "ordering" of the encrypted sub-blocks. Shuffling the encrypted data greatly increases the difficulty for an attacker attempting to recover contiguous blocks of data to decrypt by shuffling the sub-blocks into an "outoforder" sequence. These shuffled sub-blocks may then be packed into a large binary image that is loaded during production of a remote device into the configuration memory of the remote device. In one embodiment of the remote device, the memory may be a flash memory chip. By purposefully placing the data "outoforder"

the pseudorandom sequence algorithm obfuscates the SKU configuration data stored in the remote device's random access memory to prevent discovery. The remote device may then be packaged and sold.

With reference now to FIG. 15, the process depicts one embodiment where the user has selected a device configuration profile or remote configuration for the remote device to emulate. The SKU number selected by the user is translated by the remote device microprocessor using the pseudorandom sequence algorithm into a list of memory addresses. This list appears random to an outside observer, but is in fact the correctly ice to emulate. The SKU number selected by the user is translated by the remote device The microprocessor reads the sub-blocks at the address on the generated list and that set of blocks is the encrypted SKU configuration information for the selected OEM remote device. The microprocessor reverses the encryption process and then may store the recovered data into active configuration memory which determines the typical operation of the remote device as selected by the user.

Figure 16:
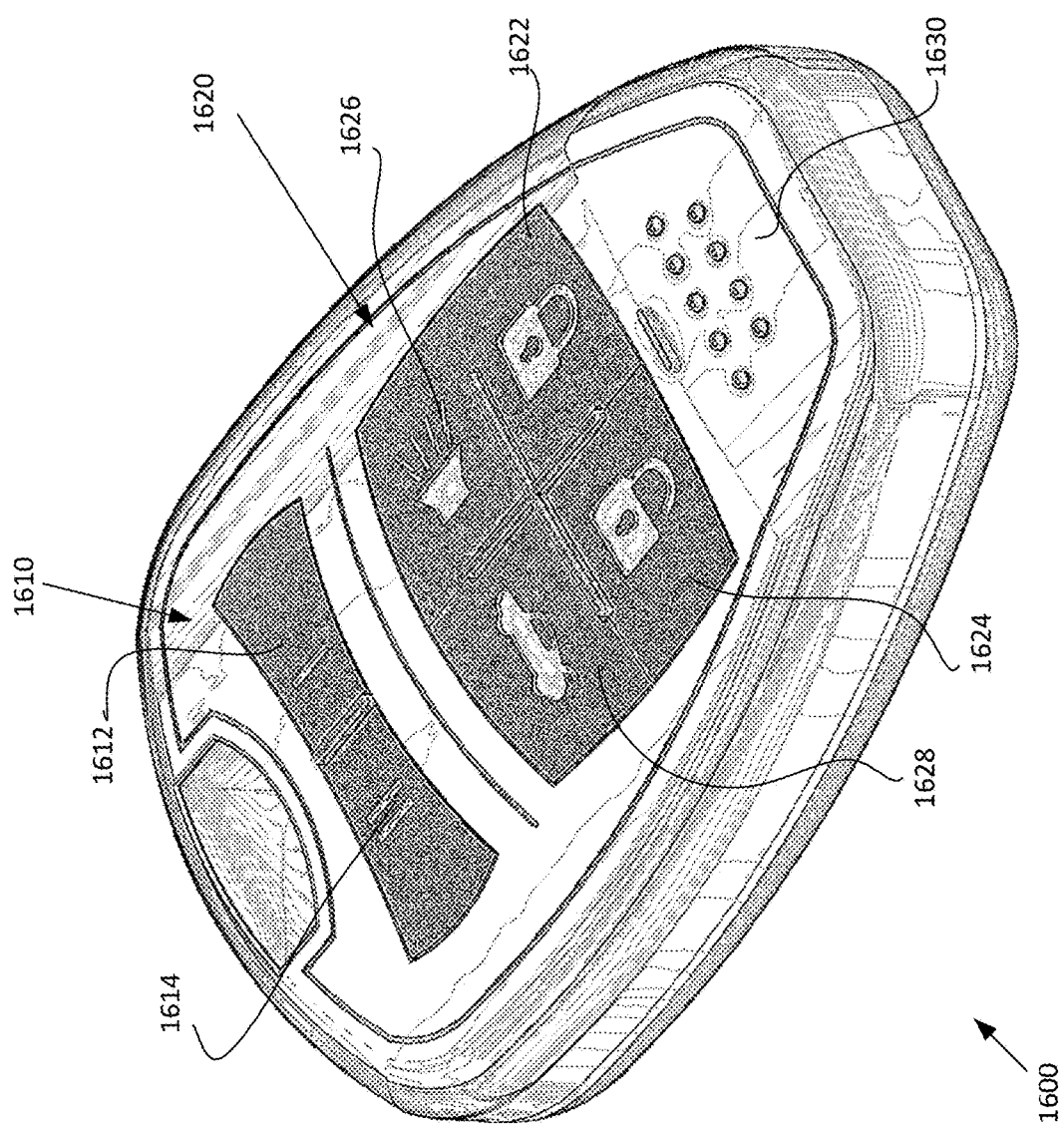
FIG. 16 provides a plan view of an exemplary embodiment of a keyless remote entry device.

With reference now to FIG. 16, a plan view of an exemplary embodiment of a remote device 1600 is provided. In this embodiment, the remote device 1600 does not comprise a physical key, instead it has device configuration profile selection keys 1610, function keys 1620, and secondary function key 1630. The remote device 1600 may further comprise an opening to allow for the attachment of a key ring, lanyard, or other retaining means. In this embodiment, the internal circuitry of the remote device 1600 may comprise a processor, a memory, and a transmitter. The memory may be loaded with one or more sets of device configuration profiles.

In one embodiment, the remote device 1600 may have, for example, two sets of device configuration profiles stored in the memory. To operate the remote device 1600, a user may select, for example, the first of two sets of device configuration profiles stored in the memory. This may be performed by pressing the first device configuration profile selection key 1612 associated with the first set of device configuration profile. The remote device 1600 will automatically be configured to this first set of device configuration profile after the first set of device configuration profile is read from the memory. The function keys 1620 may then be selectively operated by a user to perform the function associated with each key according to the first set of device configuration profile. The lock key 1622 may be used to lock an end device associated with the first set of device configuration profile, the unlock key 1624 may be used to unlock an end device associated with the first set of device configuration profile, the alarm key 1626 may be used to activate or deactivate the alarm of an end device associated with the first set of device configuration profile, and the trunk key 1628 may be used to open the trunk of an end device associated with the first set of device configuration profile. While the function keys 1620 may be associated with specific functions, they may be also be assigned to perform functions different than locking, unlocking, alarm, and trunk according to the configuration of the currently active set of device configuration profile. A user may press the second device configuration profile selection key 1614 to cause the remote device 1600 to read the second set of device configuration profile from the memory and automatically configure the remote device 1600 according to the second set of device configuration profile. The function keys 1620 will then operate according to the functions associated with the second set of device configuration profile.

The remote device 1600 may also have a secondary function key 1630 that may be configured to perform one of a number of tasks. The secondary function key 1630 may be configured to, for example, operate a garage door, operate an additional function on an end device, or activate an other device not associated with the currently active set of device configuration profile. The secondary function key 1630 may keep the same function across all sets of device configuration profiles or may be re-configured based on the currently selected or active set of device configuration profile. The remote device 1600 may also have additional keys, buttons, or switches on its face and may be used to select from and operate according to a plurality of sets of device configuration profiles. The remote device 1600 may also comprise a radio frequency identification ("RFID") or similar RF device to enable the remote device 1600 to handshake or connect to an end device without user operation. The device configuration profile keys 1610 and function keys 1620 may also be replaced by a user to change the look or feel of the physical keys.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A selectively programmable radio frequency ("RF") remote access device, the remote access device comprising:
a logic board comprising a processor and at least one memory;
a set of user inputs;
a transceiver;
wherein the at least one memory comprises a first read-only memory comprising a plurality of firmware configurations for the logic board, and a second memory which comprises an active memory partition adapted to store an active firmware configuration;
wherein each firmware configuration in the plurality of firmware configurations comprises a set of properties for controlling the processor, the memory, and the transceiver;
wherein the active firmware configuration is read from the plurality of firmware configurations from the first read-only memory based on a user input from the set of user inputs and is written into the active memory partition of the second memory; and
wherein the logic board is automatically configured by the selected firmware configuration loaded into the active partition of the second memory to communicate with an external device via the transceiver.

2. The system of claim 1, wherein each of the plurality of firmware configurations comprise a set of vendor specific properties.

3. The system of claim 2, wherein the vendor specific properties comprise one or more of transmit and/or receive frequencies, modulation schemes, binary encoding algorithms, data encoding techniques, packet payload templates, and algorithms configured to generate rolling codes to replicate the function of an original equipment manufacturer ("OEM") keyless entry remote device.

4. The system of claim 1, wherein the set of user inputs are adapted to provide for the user selection of a firmware configuration from the plurality of firmware configurations.

5. The system of claim 1, wherein the transceiver is adapted to generate an RF signal based on the active firmware configuration and transmit the RF signal to the external device to cause an end device to perform a predefined operation.

6. The system of claim 1, wherein each firmware configuration in the plurality of firmware configurations is associated with a specific external device.

7. The system of claim 1, wherein the plurality of firmware configurations in the read-only memory are stored in an encrypted format.

8. The system of claim 7, wherein the active firmware configuration selected by the user is decrypted by the processor from the read-only memory prior to being written to the active memory partition of the second memory.

9. The system of claim 1, wherein the logic board comprises an encryption engine.

10. The system of claim 5, wherein the generated RF signal comprises a rolling code packet payload.

11. A method for selectively programming a selectively programmable radio frequency ("RF") remote access device, the method comprising:
    storing in a first read-only memory a plurality of firmware configurations for a logic board comprising a processor and a memory;
    setting an active memory partition in a second memory in a neutral state, the active memory partition adapted to store an active firmware configuration;
    wherein each firmware configuration in the plurality of firmware configurations comprises a set of properties for controlling the processor, the memory, and the transceiver;
    reading a selected active firmware configuration from the plurality of firmware configurations in the first read-only memory based on a user input from a set of user inputs;
    writing the selected active firmware configuration to the active memory partition of the second memory; and
    automatically configuring the logic board based on the selected active firmware configuration loaded into the active partition of the second memory to communicate with an external device via a transceiver.

12. The method of claim 11, wherein each of the plurality of firmware configurations comprise a set of vendor specific properties.

13. The method of claim 12, wherein the vendor specific properties comprise one or more of transmit and/or receive frequencies, modulation schemes, binary encoding algorithms, data encoding techniques, packet payload templates, and algorithms configured to generate rolling codes to replicate the function of an original equipment manufacturer ("OEM") keyless entry remote device.

14. The method of claim 11, further comprising:
    generating by the transceiver an RF signal based on the selected active firmware configuration; and
    transmitting the RF signal to the external device to cause an end device to perform a predefined operation.

15. The method of claim 11, wherein each firmware configuration in the plurality of firmware configurations is associated with a specific external device.

16. The method of claim 11, wherein the plurality of firmware configurations in the read-only memory are stored in an encrypted format.

17. The method of claim 16, further comprising decrypting by the processor the selected active firmware configuration from the read-only memory prior to writing the selected active firmware configuration to the active memory partition of the second memory.

18. The method of claim 11, wherein the logic board comprises an encryption engine.

19. The method of claim 14, wherein the generated RF signal comprises a rolling code packet payload.

* * * * *